(12) United States Patent
Kawamura et al.

(10) Patent No.: US 6,344,499 B1
(45) Date of Patent: *Feb. 5, 2002

(54) PUNCTURE SEALING AGENT

(75) Inventors: Kazuhiko Kawamura, Akashi; Tamisuke Kimura, Kobe; Akihiko Hamada, Kakogawa; Yoshiaki Miyamoto; Maiko Okada, both of Kobe, all of (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,404

(22) Filed: Feb. 2, 2000

Related U.S. Application Data

(62) Division of application No. 08/978,147, filed on Nov. 25, 1997, now Pat. No. 6,063,837.

(30) Foreign Application Priority Data

Dec. 4, 1996 (JP) .............................. 8-324385
Nov. 14, 1997 (JP) .............................. 9-313579

(51) Int. Cl.$^7$ ..................... C08L 7/02; C08L 93/04; C08K 5/103
(52) U.S. Cl. ................. 523/166; 524/274; 524/386; 524/499; 524/575.5; 524/595; 524/596; 528/932; 528/934; 528/935; 435/267; 152/503; 152/529

(58) Field of Search ............ 523/166; 524/575.5, 524/595, 596, 274, 386, 499; 528/932, 934, 935; 435/267; 152/503, 509

(56) References Cited

U.S. PATENT DOCUMENTS

| 2,367,120 A | | 1/1945 | Hessels ................... 528/932 |
| 5,124,395 A | | 6/1992 | Abramowski et al. ...... 523/166 |
| 5,610,212 A | | 3/1997 | Tanaka et al. ........... 524/575.5 |
| 5,691,446 A | | 11/1997 | Dove ...................... 528/934 |
| 6,063,837 A | * | 5/2000 | Kawamura et al. ........ 523/166 |
| 6,176,285 B1 | * | 1/2001 | Gerresheim et al. ....... 152/509 |

FOREIGN PATENT DOCUMENTS

| EP | 0584597 A1 | 3/1994 | |
| FR | 1072149 | 9/1954 | ............. 524/575.5 |
| GB | 2116194 | 9/1983 | |
| JP | 0140704 | 12/1978 | ................ 523/166 |
| WO | WO9628500 A1 | 9/1996 | |

* cited by examiner

Primary Examiner—Peter Szekely
(74) Attorney, Agent, or Firm—Birch, Stewart, Kolasch & Birch, LLP

(57) ABSTRACT

A puncture sealing agent for sealing an inner surface of a tire comprises a deproteinized rubber latex that is formed by removing protein from a natural rubber latex. The puncture sealing agent includes nitrogen content at 0.1 wt. % or less of rubber solid content of the deproteinized rubber latex, and ammonia content at 0.5 wt. % or less of the rubber solid content.

7 Claims, No Drawings

PUNCTURE SEALING AGENT

This application is a divisional of co-pending Application No. 08/978,147, filed on Nov. 25, 1997, now U.S. Pat. No. 6,063,837 the entire contents of which are hereby incorporated by reference.

BACKGROUND OF THE INVENTION

The present invention relates to a puncture sealing agent capable of suppressing corrosion and damage given to steel cords of a tire and enhancing the sealing effect, while maintaining resistance to putrefaction of the sealing agent itself.

FIELD OF THE INVENTION

A known puncture sealing agent is, for example, injected into the inner space of a tire, and seals the damaged part from inside in case of puncture to keep airtight.

Hitherto, it is mainly composed of natural rubber latex, and contains ammonia at a high concentration of about 1.2 wt. % of rubber solid content to suppress solidification of latex and enhance stability in liquid state (liquid stability). In this composition, of impurities contained in natural rubber latex such as protein, fatty acid, other acetone extracts and ash content, the protein adsorbed on rubber particles is loaded with a strong negative electric charge in an alkaline state by addition of ammonia, and therefore rubber particles exist in the latex in a stable state without bonding each other. Moreover, ammonia transforms latex into an alkaline state, and oxidation and putre-faction of the protein can be suppressed, and thereby occurrence of malodour, degeneration, and deterioration are prevented.

Herein, the content of protein in natural rubber latex is usually expressed by a converted value on the basis of the nitrogen content measured by Kjeldahl method by multiplying this nitrogen content by 6.3 times, and conventional natural rubber latex contains protein equivalent to about 0.2 to 0.3 wt. % in the nitrogen content measured by Kjeldahl method.

According to Kjeldahl method, in a solid sample by evaporating water content, a decomposition promoter (mercury, mercury oxide, copper sulfate, etc.) is added, and the sample is pyrolyzed in concentrated sulfuric acid, potassium oxide, or sulfuric acid, fuming sulfuric acid, and nitrogen in the sample transformed into ammonium sulfate is quantitatively measured from this ammonium sulfate. Therefore, the ammonia added in the natural rubber latex disappears along with evaporation of water content before measurement. As a result, in Kjeldahl method, the nitrogen content in protein only is measured, without containing nitrogen in ammonia.

On the other hand, the content of ammonia in rubber latex is usually measured by a method specified in JIS K 6381, 5.3 (total alkali content), and conventional puncture sealing agent contains about 1.2 wt. % of ammonia according to this measuring method.

In the conventional sealing agent, however, although the liquid stability is enhanced by ammonia, it takes time to solidify and freeze the puncture damaged portion, and the sealing effect is insufficient. Still worse, ammonia may invade into the inside of the tire from the puncture damaged portion, and which may corrode steel cords used in the belt layer and carcass to lower the tire strength and durability. In addition, the stimulating smell of ammonia is a strong discomfort for the person handling the puncture sealing agent.

If the ammonia content is lowered, in particular, putrefaction of protein cannot be suppressed enough, and if other chemical is used as stabilizing agent instead of ammonia in order to maintain liquid stability, it is hard to expect to maintain satisfactory liquid stability and sealing performance.

SUMMARY OF THE INVENTION

It is hence an object of the invention to present a puncture sealing agent capable of preventing occurrence of stimulating smell or corrosive damage of steel cord due to ammonia, shortening the time to start cross-linking of rubber particles and solidify by stimulation of pressure or the like, and enhancing the sealing effect, without leading to putrefaction of protein if the ammonia content is less than 0.5 wt. %.

According to one aspect of the present invention, a puncture sealing agent for sealing an inner surface of a tire comprising a deproteinized rubber latex made by removing protein from a natural rubber latex, wherein nitrogen content is 0.1 wt. % or less of rubber solid content of the deproteinized rubber latex, and ammonia content is 0.5 wt. % or less of the rubber solid content.

Herein the nitrogen content is measured by the Kjeldahl method, and the ammonia content is measured by a method specified in JIS K 6381, 5.3.

Preferably, a surface active agent should be contained as stabilizing agent by 0.01 to 1.8 wt. % of rubber solid content in the puncture sealing agent, and it is particularly preferred to use potassium rosinate as stabilizing agent because rubber particles in latex start cross-linking by stimulation of pressure or the like to enhance the pressure sensitive characteristic which is the nature to solidify and freeze, thereby enhancing the sealing performance.

DETAILED DESCRIPTION OF THE INVENTION

A puncture sealing agent comprises a deproteinized rubber latex having the nitrogen content at 0.1 wt. % or less of the rubber solid content, and the deproteinized rubber latex is used in low ammonia state with ammonia content of 0.5 wt. % or less of the rubber solid content. In this embodiment, the deproteinized rubber latex is further blended with a stabilizing agent for keeping liquid stability, an adhesive agent for enhancing the tackiness of the latex surface to encourage adhesion with the tire inner surface, and an antifreeze agent.

The deproteinized rubber latex used in the invention is made of natural rubber latex, from which protein and other impurities and gel contained in rubber particles of crude rubber are removed, and the nitrogen content as the conversion reference of the protein content is decreased to a level of 0.1 wt. % or less of the rubber solid content.

The deproteinized rubber latex is formed by adding protease to latex to decompose protein, and washing repeatedly by using surface active agent.

The latex used as the starting material for obtaining this deproteinized rubber latex may be either fresh field latex obtained from natural rubber tree, or commercial ammonia treated latex.

The protease is not particularly limited, and those derived from bacteria, mold or yeast may be used, but it is particularly preferred to use protease derived from bacteria. As the surface active agent for washing, for example, one type or more of anionic surface active agent and/or one type or more of non-ionic surface active agent may be used.

Examples of anionic surface active agent include carboxylic system, sulfonic system, ester sulfate system, ester phosphate system, and other surface active agents. Carboxylic surface active agents include, for example, fatty acid salt, polyhydric carboxylate, rosinate, dimer acid salt, polymer acid salt, and tall fatty acid salt, with 6 to 30 carbon atoms, and preferably carboxylate with 10 to 30 carbon atoms. If carbon atoms are less than 6 dispersion and emulsification of protein and impurities are insufficient, and if carbon atoms are more than 30, it is hard to disperse in water.

Sulfonic surface active agents include, for example, alkyl benzene sulfonate, alkyl sulfonate, alkyl naphthalene sulfonate, naphthalene sulfonate, and diphenyl ether sulfonate. Ester sulfate surface active agents include, for example, alkyl ester sulfate, polyoxy alkylene alkyl ester sulfate, polyoxy alkylene alkyl phenyl ether sulfate, tristyrene-phenol ester sulfate, and polyoxy alkylene distyrene-phenol ester sulfate. Ester phosphate surface active agents include, for example, alkyl ester phosphate and polyoxy alkylene ester phosphate. Salts of these compounds include metal salts (Na, K, Ca, Mg, Zn, etc.), ammonia salt, amine salt (triethanolamine salt, etc.), and others.

As non-ionic surface active agents, for example, polyoxy alkylene ether system, polyoxy alkylene ester system, polyhydric alcohol fatty acid ester system, sugar-fatty acid ester system, and alkyl polyglycoside system are preferably used. Non-ionic surface active agents of polyoxy alkylene ether system include, for example, polyoxy alkylene alkyl ether, polyoxy alkylene alkyl phenyl ether, polyoxy alkylene polyol alkyl ether, polyoxy alkylene styrene-phenol ether, polyoxy alkylene distyrene-phenol ether, polyoxy alkylene tristyrene-phenol ether, and polyoxy ethylene lauryl ether sodium sulfate (Emar E-70C of Kao Corp.). The polyol may be polyhydric alcohol with 2 to 12 carbon atoms, including, for example, propylene glycol, glycerin, sorbitol, glucose, sucrose, pentaerythritol, and sorbitan.

Non-ionic surface active agents of polyoxy alkylene ester system include, for example, polyoxy alkylene fatty acid ester. Non-ionic surface active agents of polyhydric alcohol fatty acid ester system include, for example, fatty acid ester of polyhydric alcohol and fatty acid ester of polyoxy alkylene polyhydric alcohol with 2 to 12 carbon atoms. More specifically, for example, sorbitol fatty acid ester, sorbitan fatty acid ester, fatty acid monoglyceride, fatty acid diglyceride, and polyglycerin fatty acid ester are known. Also their mixtures with polyalkylene oxide may be used (for example, polyoxy alkylene sorbitan fatty acid ester, and polyoxy alkylene glycerin fatty acid ester).

Non-ionic surface active agents of sugar-fatty acid ester system include, for example, cane sugar, glucose, maltose, fructose, and polysaccharide fatty acid ester, and their mixtures with polyalkylene oxide may be also used. Non-ionic surface active agents of alkyl polyglycoside system include, for example, alkyl glucoside, alkyl polyglucoside, polyoxy alkylene alkyl glucoside, and polyoxy alkylene alkyl polyglucoside, also including their fatty acid esters. Their mixtures with polyalkylene oxide may be also used.

The alkyl group used in these surface active agents may include alkyl group with 4 to 30 carbon atoms. The polyoxy alkylene group may have an alkylene group with 2 to 4 carbon atoms. For example, ethylene oxide with 1 to about 50 moles may be used. The fatty acid may be either saturated or unsaturated fatty acid of straight chain or branched chain with 4 to 30 carbon atoms.

Instead of the anionic ion surface active agent-and/or non-ionic surface active agent, or together with these surface active agents, an amphoteric surface active agent may be also used. Examples of amphoteric surface active agent include, for example, surface active agents of amino acid type, betaine type, and amine oxide type.

To decompose protein in natural rubber latex by using protease, the protease is added at a rate of about 10 to 0.001 wt. % of latex weight to the field latex or ammonia treated latex. If the adding amount is less than 0.001 wt. %, it is too little, and sufficient effect is not obtained, or if exceeding 10 wt. %, it is too much, and the cost is increased, while the enzyme activity is lowered.

The enzyme may be added also together with other additives, for example, pH regulating agent, such as monobasic potassium phosphate, dibasic potassium phosphate, sodium dihydrogen phosphate, other phosphates, potassium acetate, sodium acetate, other acetates, sulfuric acid, acetic acid, hydrochloric acid, nitric acid, citric acid, succinic acid, other acids or their salts, ammonia, sodium hydroxide, potassium hydroxide, sodium carbonate, sodium hydrogen carbonate, and others. The enzyme may be also combined with other enzymes, such as lipase, esterase, amylase, laccase, and cellulase.

Moreover, as required, styrene sulfonic acid copolymer, acrylamide tertiary butyl sulfonic acid alone or copolymer, vinyl sulfonate alone or copolymer, 3-sulfopropyl-(meth) acrylic acid ester salt alone or copolymer, naphthalene sulfonic acid formalin condensate, lignin sulfonic acid, polycyclic aromatic sulfonic acid copolymer, acrylic acid and maleic anhydride homopolymer and copolymer, isobutylene-acrylic acid, isobutylene-maleic anhydride copolymer, other anionic oligomer or polymer may be used also as dispersing agent.

The decomposition treating time by the enzyme is not particularly limited, but it is preferred to treat in several minutes to about a week, usually about 24 hours. The latex may be either stirred or kept still, if necessary, the temperature may be regulated, and a proper temperature is 5 to 90 deg. C., preferably 20 to 60 deg. C. If the treating temperature exceeds 90 deg. C., deactivation of enzyme takes place earlier, and if lower than 5 deg. C., reaction of enzyme is hardly promoted.

As the washing method of latex by surface active agent, for example, the surface active agent and water for dilution are added to the latex after completion of enzyme treatment, and the centrifugal method is preferred, and in this case it is appropriate to add the surface active agent by 0.001 to 10 wt. % of the latex weight. By this centrifugal separation, the nitrogen content is notably decreased to less than 0.1 wt. %, and a deproteinized rubber latex substantially removing protein is obtained in a cream form. This deproteinized rubber latex is diluted in water, and the deproteinized rubber latex containing rubber solid content by 55 to 65 wt. % in the latex is formed.

Instead of the centrifugal separation, a washing method of aggregating and separating the latex may be also employed. The centrifugal separation may be done only once or several times. Although washing is done by adding the surface active agent after enzyme decomposition, but alternatively, after decomposition treatment by adding enzyme and surface active agent simultaneously, it may be diluted in water and washed by centrifugal separation. Anyway, the method of obtaining the deproteinized rubber latex is not particularly limited.

In the deproteinized rubber latex, ammonia is added at the time of dilution, and putrefaction of the slightly remaining protein is suppressed, and also a stabilizing agent for keeping liquid stability, an adhesive agent for promoting the adhesion of the latex surface, and an antifreeze agent are further added.

At the time, the ammonia content is in a range of 0.5 wt. % or less of the rubber solid content. In the starting material of latex, meanwhile, usually ammonia is contained by about 1.2 wt. % (to the rubber solid content), and after the first centrifugal separation in the washing process, about 0.085 wt. % may be left over, and after the second centrifugal separation, about 0.006 wt. % may remain. Considering this residual amount, it is necessary to adjust the adding amount of ammonia.

As the stabilizing agent, the surface active agent used in the washing process may be used, for example, anionic active agents such as carboxylic system, sulfonic system, ester sulfate system, and ester phosphate system, and/or non-ionic surface active agents of polyoxy alkylene ether system, polyoxy alkylene ester system, polyhydric alcohol fatty acid ester system, sugar-fatty acid ester system, and alkyl polyglycoside system, and moreover, as the anionic active agents, among the carboxylic system, fatty acid salt and rosinate are preferred, and as the non-ionic surface active agents, among the polyoxy alkylene ether system, polyoxy ethylene alkyl ether, polyoxy ethylene alkyl phenyl ether, and polyoxy ethylene lauryl ether sodium sulfate (Emar E-70C of Kao Corp.) are preferred. In particular, potassium rosinate is preferred in the aspects of enhancing the pressure sensitive characteristic of the latex and reinforcing the sealing performance.

As the stabilizing agent, it is preferred that the total amount of the surface active agents including the surface active agent for washing remaining in the deproteinized rubber latex after the washing process may be 0.01 to 1.8 wt. %, and if less than 0.1 wt. %, it is hard to obtain a sufficient stabilizing effect, and especially if less than 0.01 wt. %, the stabilizing effect is insufficient. To the contrary, if more than 0.5 wt. %, sufficient puncture sealing performance is not obtained, and especially if more than 1.8 wt. %, the puncture sealing performance is insufficient. Hence, more preferably, it should be in a range of 0.1 to 0.5 wt. %. Incidentally, the amount of the surface active agent left over after the first centrifugal separation is $1/14$ of the portion of the rubber solid content added at the time of deproteinizing process, and after the second centrifugal separation, it is further $1/14$ thereof.

The adhesive agent is not particularly limited, and various synthetic resins from petroleum hydrocarbon such as cumarone resin, natural resins from rosin and its derivatives, and polyterpene and high polymer terpene compounds can be used. The adding amount of the adhesive agent is preferably 20 to 35 wt. % of the entire puncture sealing agent, and if less than 20 wt. %, the adhesion of the sealing agent is poor, and the puncture sealing performance and the seal retaining performance are inferior. If exceeding 35 wt. %, to the contrary, since the content of the latex is smaller, and the puncture sealing performance is inferior.

As the antifreeze agent, ethylene glycol, polyethylene glycol, and other glycols may be used. The adding amount of the antifreeze agent is preferably 14 to 25 wt. % of the entire puncture sealing agent, and if less than 15 wt. %, the sealing agent is frozen in cold district and cannot be used, and if more than 25 wt. %, the puncture sealing performance is inferior.

Thus, the puncture sealing agent of the invention comprises deproteinized rubber latex with nitrogen content of 0.1 wt. % or less, and protein contained in rubber particles of latex is substantially removed, and therefore rubber particles start crosslinking easily by mechanical stimulation such as pressure. Accordingly, the sealing agent getting into the gap in the puncture damaged portion is quickly solidified by stimulation of compression by air pressure or the like, and the air leak is stopped promptly, and the sealing effect is enhanced.

By the use of such deproteinized rubber latex, the ammonia content can be reduced to 0.5 wt. % or less while suppressing rubber putrefaction, thereby preventing occurrence of corrosion or damage of steel cord and stimulating smell by ammonia. Mean while, if the nitrogen content exceeds 0.1 wt. %, enhancement of sealing effect is not achieved, and a significant increase of ammonia is needed to prevent putrefaction of rubber, and corrosion and damage of steel cords cannot be prevented. Therefore, for enhancing the sealing effect and curtailing ammonia, it is preferred to control the nitrogen content under 0.06 wt. %. In natural rubber, incidentally, when one molecule of rubber of low molecular weight of 100,000 is bonded with one molecule of peptide existing in molecular bonding, that is, one atom of nitrogen, the nitrogen content is 0.014 wt. %, and hence it is considered nitrogen corresponding to this portion is not removed but is left over. Hence, the lower limit of nitrogen content is 0.014 wt. % or more. Besides, the lower limit of ammonia content is preferred to be 0.1 wt. % or more for prevention of putrefaction.

Embodiments

Using the deproteinized rubber latex formed in the following method, samples of puncture sealing agent were prepared according to the specification in Table 1, and the degree of ammonia stimulating smell, resistance to rubber putrefaction, puncture sealing performance, liquid stability, seal retaining property, and liquid state (–20 deg. C.) were tested in comparison with an existing agent, and the results are shown in Table 1.

The degree of ammonia stimulating smell was investigated by smelling, and scored in four ranks by sensory evaluation: no smell (⊚), slight smell (○), medium smell (Δ), and strong smell (X).

The resistance to rubber putrefaction was tested by leaving the samples in the condition of temperature of 35 deg. C. for 90 days, investigated by smelling, and scored in four ranks by sensory evaluation: no smell (⊚), slight smell (○), medium smell (Δ), and strong smell (X).

The puncture sealing performance was investigated by judging the time until sealing by the air leak amount, and scored in five ranks by exponential evaluation, on the basis of the conventional product scored at 3. The larger value means the superior performance.

The liquid stability was investigated by leaving the samples in the condition of temperature of 70 deg. C. for 10 days, visually observing the state changes, and evaluating in four ranks: remaining as liquid (⊚), slightly creamy (○), creamy (Δ), and solidified (X).

The seal retaining property was evaluated by measuring if there was air leak or not from the puncture hole until traveling 100 km after sealing, and scored in two ranks: no air leak (○), and air leak (X).

The liquid state (–20 deg. C.) was the liquid state in the environments at –20 deg. C., as evaluated in two ranks: the sealing agent not frozen and hence usable (○). and frozen and not usable (X).

In the table, the deproteinized rubber latex used in embodiments and comparative example was prepared by using 100 g of natural rubber latex with rubber solid content of 30 wt. % obtained by diluting high ammonia latex of natural rubber in water, adjusting the pH to 9.0 by adding sodium dihydrogen phosphate as pH regulating agent to 100 g of this natural rubber latex, adding 0.02 g of protease and 1 g of surface active agent (polyoxy ethylene lauryl ether sodium sulfate (Emar E-70C of Kao Corp.)), and letting stand for 24 hours at 30 deg. C. to deproteinize.

Consequently, adding water to the decomposed latex to dilute until the rubber solid content became 10 wt. %, it was centrifuged for 30 minutes at 10000 rpm, and an upper creamy layer was separated as deproteinized rubber latex after first washing. To remove the protein layer (nitrogen content) further, this creamy layer is similarly diluted in water until the rubber solid content is 10 wt. %, and thereafter deproteinized rubber latex after second and subsequent washing is obtained.

As shown in Tables 1, 2, the sealing agents in the invention can enhance the sealing effect while maintaining the excellent resistance to putrefaction and liquid stability, and also prevent occurrence of stimulating smell derived from ammonia. On the other hand, in the conventional product, since the ammonia content is high, it is likely to scatter away, thereby significantly lowering the resistance to putrefaction and liquid stability.

From the comparison between embodiments 1 to 4, and the comparative example 1, it is known that the nitrogen content is required to be 0.1 wt. % or less from the viewpoint of resistance to putrefaction and the puncture sealing performance, and more preferably 0.06 wt. % or less.

From the comparison between embodiment 4 and embodiments 13, 14, it is known that the content of the adhesive agent is preferred to be 20 to 35 wt. % from the viewpoint of the puncture sealing performance and seal retaining property.

From the comparison between embodiment 4 and embodiments 15, 16, it is known that the content of the antifreeze agent is preferred to be 14 to 25 wt. % from the viewpoint of puncture sealing performance and liquid state.

From the comparison of embodiments 4, 12, it is known that the it is effective for liquid stability to add a compound generally known as vulcanization promoter. This compound (hereinafter called vulcanization promoter) is thiuram and dithiocarbamate, and examples include tetracis(2-ethylhexyl) thiuram disulfide, and zinc dibenzyl dithiocerbaminate. This acceleration promoter is preferred to be added by 0.1 to 0.5. wt. % of the rubber solid content of deproteinized rubber latex, and it is not effect if less than 0.1 wt. %, and the puncture sealing performance is inferior if over 0.5 wt. %.

Moreover, from the comparison of embodiments 4, 8 to 11, the content of the stabilizing agent is known to be preferred to be 0.01 to 1.8 wt. % from the viewpoint of the puncture sealing performance and liquid stability, and more preferably in a range of 0.1 to 0.5 wt. %.

TABLE 1

|  | Conventional product | Comparative example 1 | Embodiment 1 | Embodiment 2 | Embodiment 3 | Embodiment 4 | Embodiment 5 | Embodiment 6 | Embodiment 7 |
|---|---|---|---|---|---|---|---|---|---|
| Natural rubber latex | 60 | | | | | | | | |
| (rubber solid content) | (36) | | | | | | | | |
| Deproteinized rubber latex | | 60 | 60 | 60 | 60 | 60 | 60 | 60 | 60 |
| (rubber solid content) | | (36) | (36) | (36) | (36) | (36) | (36) | (36) | (36) |
| Adhesive agent(*1) | 24 | 24 | 24 | 24 | 24 | 24 | 24 | 24 | 24 |
| Antifreeze agent(*2) | 16 | 16 | 16 | 16 | 16 | 16 | 16 | 16 | 16 |
| Stabilizing agent(*3) | — | 0.2 | 0.2 | 0.2 | 0.2 | 0.2 | 0.2 | 0.2 | 0.2 |
| (adding amount + residual amount) | — | (0 + 0.2) | (0 + 0.2) | (0 + 0.2) | (0 + 0.2) | (0 + 0.2) | (0 + 0.2) | (0 + 0.2) | (0 + 0.2) |
| Vulcanization promoter(*4) | — | — | — | — | — | — | — | — | — |
| Ammonia content(*5) | 1.2 | 0.5 | 0.5 | 0.5 | 0.5 | 0.5 | 0.5 | 0.3 | 0.1 |
| Nitrogen content(*5) | 0.3 | 0.12 | 0.10 | 0.08 | 0.06 | 0.03 | 0.015 | 0.03 | 0.03 |
| Ammonia stimulating smell | x | ○ | ○ | ○ | ○ | ○ | ○ | ○ | ◉ |
| Rubber putrefaction resistance | Δ | x | Δ | Δ | ○ | ○ | ◉ | ○ | Δ |
| Puncture sealing performance | 3 | 3 | 4 | 4 | 5 | 5 | 5 | 5 | 5 |
| Liquid stability | Δ | ○ | ○ | ○ | ○ | ○ | ○ | ○ | Δ |
| Seal retaining property | ○ | ○ | ○ | ○ | ○ | ○ | ○ | ○ | ○ |
| Liquid state (−20 deg. C.) | ○ | ○ | ○ | ○ | ○ | ○ | ○ | ○ | ○ |

(*1)Dermulsene DT-75 (terpene compound, DRT, France)
(*2)Ethylene glycol
(*3)Polyoxy ethylene lauryl ether sodium sulfate (Emar E-70C, Kao Corp.)
(*4)TOT-N (Noxellar TOT-N, Ouchi Shinko Chemical Industrial, Ltd.)
(*5)Content per 100 of rubber solid content

TABLE 2

|  | Embodiment 8 | Embodiment 9 | Embodiment 10 | Embodiment 11 | Embodiment 12 | Embodiment 13 | Embodiment 14 | Embodiment 15 | Embodiment 16 |
|---|---|---|---|---|---|---|---|---|---|
| Natural rubber latex | | | | | | | | | |
| (rubber solid content) | | | | | | | | | |
| Deproteinized rubber latex | 60 | 60 | 60 | 60 | 60 | 60 | 46 | 66 | 50 |
| (rubber solid content) | (36) | (36) | (36) | (36) | (36) | (36) | (27.6) | (39.6) | (30) |
| Adhesive agent(*1) | 24 | 24 | 24 | 24 | 24 | 18 | 38 | 24 | 24 |
| Antifreeze agent(*2) | 16 | 16 | 16 | 16 | 16 | 22 | 16 | 10 | 26 |
| Stabilizing agent(*3) | 2.0 | 1.8 | 0.3 | 0.001 | 0.2 | 0.2 | 0.2 | 0.2 | 0.2 |

TABLE 2-continued

|  | Embodiment 8 | Embodiment 9 | Embodiment 10 | Embodiment 11 | Embodiment 12 | Embodiment 13 | Embodiment 14 | Embodiment 15 | Embodiment 16 |
|---|---|---|---|---|---|---|---|---|---|
| (adding amount + residual amount) | (1.8 + 0.2) | (1.6 + 0.2) | (0.1 + 0.2) | (0 + 0.001) | (0 + 0.2) | (0 + 0.2) | (0 + 0.2) | (0 + 0.2) | (0 + 0.2) |
| Vulcanization promoter(*4) | — | — | — | — | 0.3 | — | — | — | — |
| Ammonia content(*5) | 0.5 | 0.5 | 0.5 | 0.5 | 0.5 | 0.5 | 0.5 | 0.5 | 0.5 |
| Nitrogen content(*5) | 0.03 | 0.03 | 0.03 | 0.015 | 0.03 | 0.03 | 0.03 | 0.03 | 0.03 |
| Ammonia stimulating smell | ○ | ○ | ○ | ○ | ○ | ○ | ○ | ○ | ○ |
| Rubber putrefaction resistance | ○ | ○ | ○ | ⊚ | ○ | ○ | ○ | ○ | ○ |
| Puncture sealing performance | 1 | 3 | 4 | 5 | 4 | 4 | 3 | 5 | 3 |
| Liquid stability | ⊚ | ⊚ | ⊚ | x | ⊚ | ○ | ○ | ○ | ○ |
| Seal retaining property | ○ | ○ | ○ | ○ | ○ | x | ○ | ○ | ○ |
| Liquid state (−20 deg. C.) | ○ | ○ | ○ | ○ | ○ | ○ | ○ | x | ○ |

What is claimed is:

1. A puncture sealing agent for sealing an inner surface of a tire comprising a deproteinized rubber latex made by removing protein from a natural rubber latex, an adhesive agent and an antifreeze agent, wherein, nitrogen content is 0.1 wt. % or less of rubber solid content of the deproteinized rubber latex, ammonia content is 0.5 wt. % or less of the rubber solid content, said adhesive agent is composed of synthetic resins from petroleum hydrocarbon, or natural resins, and said antifreeze agent is composed of glycol.

2. The puncture sealing agent of claim 1, wherein a surface active agent of 0.01 to 1.8 wt. % of rubber solid content of the deproteinized rubber latex is contained as a stabilizing agent.

3. The puncture sealing agent of claim 1, wherein the deproteinized rubber latex has the solid content of about 55 to 65 wt. %.

4. The puncture sealing agent of claim 1, wherein the adhesive agent comprises about 20 to 35 wt. % of the entire puncture sealing agent.

5. The puncture sealing agent of claim 1, wherein the antifreeze agent comprises about 14 to 25 wt. % of the entire puncture sealing agent.

6. The puncture sealing agent of claim 1, further comprising thiuram or dithiocarbomate, wherein the thiuram or dithiocarbomate is about 0.1 to 0.5% of the rubber solid content of the deproteinized rubber latex.

7. The puncture sealing agent of claim 1, wherein the glycol is selected from the group consisting of ethylene glycol and polyethylene glycol.

* * * * *